United States Patent [19]
Müller et al.

[11] Patent Number: 5,647,987
[45] Date of Patent: Jul. 15, 1997

[54] ION EXCHANGERS

[75] Inventors: Egbert Müller, Erzhausen; Roland Gensert, Rödermark; Peter Poguntke, Otzberg, all of Germany

[73] Assignee: Merck Patent Gesellschaft mit beschrankter Haftung, Darmstadt, Germany

[21] Appl. No.: 624,478

[22] PCT Filed: Sep. 22, 1994

[86] PCT No.: PCT/EP94/03168

§ 371 Date: Apr. 3, 1996

§ 102(e) Date: Apr. 3, 1996

[87] PCT Pub. No.: WO95/09695

PCT Pub. Date: Apr. 13, 1995

[30] Foreign Application Priority Data

Oct. 4, 1993 [DE] Germany ............ 43 33 821.6

[51] Int. Cl.$^6$ ............................................ B01D 15/08
[52] U.S. Cl. ............... 210/635; 210/656; 210/198.2; 210/502.1
[58] Field of Search .................. 210/635, 656, 210/198.2, 502.1; 502/401, 402, 404, 439

[56] References Cited

U.S. PATENT DOCUMENTS

| | | | |
|---|---|---|---|
| 3,663,263 | 5/1972 | Bodre | 210/198.2 |
| 3,808,125 | 4/1974 | Good | 210/198.2 |
| 4,029,583 | 6/1977 | Ho Chang | 210/198.2 |
| 4,045,353 | 8/1977 | Kosaka | 55/386 |
| 4,140,653 | 2/1979 | Imura | 210/198.2 |
| 4,202,775 | 5/1980 | Abe | 210/287 |

(List continued on next page.)

FOREIGN PATENT DOCUMENTS

| | | | |
|---|---|---|---|
| 337144 | 3/1989 | European Pat. Off. | 210/198.2 |
| 467339 | 7/1991 | European Pat. Off. | 210/198.2 |
| 2631849 | 12/1989 | France | 210/198.2 |
| 1814598 | 12/1968 | Germany | 210/198.2 |
| 468814 | 3/1993 | Sweden | 210/198.2 |

OTHER PUBLICATIONS

Derwent Abstract of Japan Patent 62 267663 vol. 12 No. 147 (P-698) May 1988.
Derwent Abstract of Japan Patent 93-285445 Aug. 10, 1993.

*Primary Examiner*—Ernest G. Therkorn
*Attorney, Agent, or Firm*—Millen, White, Zelano, & Branigan, P.C.

[57] ABSTRACT

The invention relates to separation materials for ion exchange chromatography which are based on hydroxyl-containing base supports on whose surfaces polymers are covalently bonded, characterized in that a) the base support contains aliphatic hydroxyl groups,
b) the covalently bonded polymers are bonded to the base support via a terminal monomer unit,
c) the polymers contain monomer units of both the formula II and the formula III,
d) the monomer units are linked linearly,

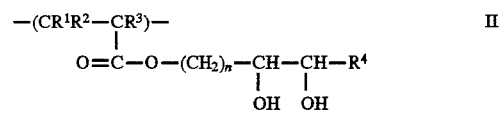

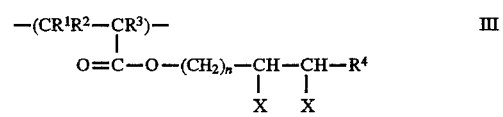

in which $R^1$, $R^2$ and $R^3$ independently of one another are H or $CH_3$,
$R^4$ is H, $C_1$–$C_5$-alkyl or $C_6$–$C_{12}$-aryl,
n is an integer between 1 and 5,
one radical X is OH and the other radical X is $NR^5R^6$, $N^+R^5R^6R^7$ or $SO_3H$, and
$R^5$, $R^6$ and $R^7$ independently of one another are $C_1$–$C_4$-alkyl, it also being possible for one or both radicals $R^5$ and/or $R^6$ to be H.

10 Claims, 1 Drawing Sheet

U.S. PATENT DOCUMENTS

| | | | |
|---|---|---|---|
| 4,246,351 | 1/1981 | Miyake | 210/692 |
| 4,324,689 | 4/1982 | Shah | 210/198.2 |
| 4,330,440 | 5/1982 | Ayers | 210/198.2 |
| 4,332,694 | 6/1982 | Kalal | 435/180 |
| 4,335,226 | 6/1982 | Muller | 210/656 |
| 4,352,884 | 10/1982 | Nakashima | 210/198.2 |
| 4,406,870 | 9/1983 | Miyake | 210/681 |
| 4,415,631 | 11/1983 | Schutijser | 210/198.2 |
| 4,551,245 | 11/1985 | Ramsden | 210/198.2 |
| 4,710,525 | 12/1987 | Kraemer | 523/201 |
| 4,737,533 | 4/1988 | Charmot | 264/311.11 |
| 4,756,834 | 7/1988 | Muller | 210/635 |
| 4,767,529 | 8/1988 | Boos | 210/198.2 |
| 4,829,101 | 5/1989 | Kraemer | 523/201 |
| 4,882,048 | 11/1989 | Blaschke | 210/198.2 |
| 4,882,226 | 11/1989 | Schutyser | 210/198.2 |
| 4,908,137 | 3/1990 | Chen | 210/679 |
| 4,937,000 | 6/1990 | Bomer | 210/656 |
| 5,135,650 | 8/1992 | Hjerten | 210/198.2 |

5,647,987

ION EXCHANGERS

The invention relates to separation materials for ion exchange chromatography.

BACKGROUND OF THE INVENTION

For ion exchange chromatography, especially of macromolecules of biological origin (biopolymers), DE 38 11 042 discloses ionic graft polymers in which all of the monomer units have the respective ionic structural elements. Despite the generally outstanding properties of these ion exchangers, in certain applications it was found that individual analyte bands were only inadequately separated. The object of the present invention is to provide separation materials having improved properties.

The application DE 43 10 964 discloses oxirane-containing activated support materials in which monomers of the formula I are grafted onto a hydroxyl-containing base support

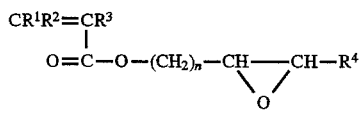

in which $R^1$, $R^2$ and $R^3$ independently of one another are H or $CH_3$,
$R^4$ is H, $C_1$–$C_5$-alkyl or $C_6$–$C_{12}$-aryl and
n is an integer between 1 and 5.

SUMMARY OF THE INVENTION

It has been found that these activated support materials can be reacted, in a manner known per se, to give separation materials for ion exchange chromatography. The resulting separation materials exhibit improved properties.

The invention therefore relates to separation materials for ion exchange chromatography which are based on hydroxyl-containing base supports on whose surfaces polymers are covalently bonded, characterized in that a) the base support contains aliphatic hydroxyl groups, b) the covalently bonded polymers are bonded to the base support via a terminal monomer unit, c) the polymers contain monomer units of both the formula II and the formula III, d) the monomer units are linked linearly,

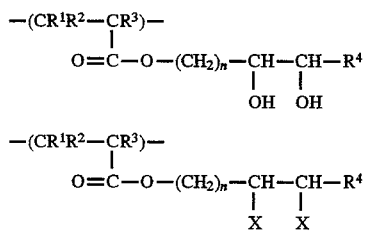

in which $R^1$, $R^2$ and $R^3$ independently of one another are H or $CH_3$,
$R^4$ is H, $C_1$–$C_5$-alkyl or $C_6$–$C_{12}$-aryl,
n is an integer between 1 and 5,
one radical X is OH and the other radical X is $NR^5R^6$, $N^+R^5R^6R^7$ or $SO_3H$, and
$R^5$, $R^6$ and $R^7$ independently of one another are $C_1$–$C_4$-alkyl, it also being possible for one or both radicals $R^5$ and/or $R^6$ to be H.

The invention relates to the use of the separation materials according to the invention in the separation of mixtures of at least two substances, in particular for the separation of biopolymers, by ion exchange chromatography.

The invention also relates to processes for the preparation of separation materials for ion exchange chromatography, characterized in that oxirane-containing activated support materials known from DE 43 10 964 are reacted with sulfurous acid or its salts or with primary, secondary or tertiary amines of the formula IV $$NR^5R^6R^7 \qquad \text{IV}$$

in which $R^5$, $R^6$ and $R^7$ independently of one another are $C_1$–$C_4$-alkyl, it also being possible for one or two of these radicals to be H.

The invention relates to methods of separating mixtures of at least two substances, in particular for the separation of biopolymers, by ion exchange chromatography using the separation materials according to the invention.

DESCRIPTION OF PREFERRED EMBODIMENTS

Figure 1:
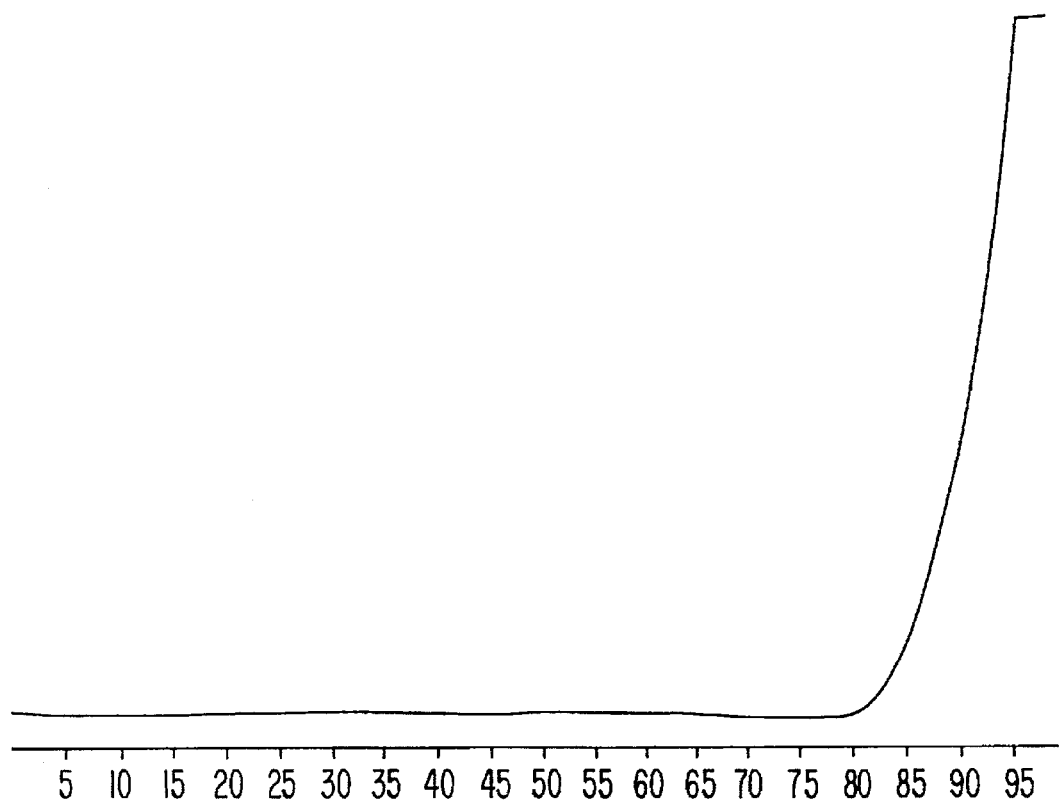
FIG. 1 shows an elution curve (breakthrough curve); experimental details can be found in Use Example A.

In accordance with the invention, cation exchangers containing sulfonyl groups can be prepared using sulfurous acid or its salts. For the preparation of anion exchangers it is possible to use primary, secondary or tertiary alkylamines having 1–4 carbon atoms in the alkyl chain or chains. Consequently, the radicals $R^5$, $R^6$ and $R^7$, in each case independently of one another, can be methyl, ethyl, propyl, isopropyl, n-butyl, isobutyl or tert-butyl, it also being possible for one or two of these radicals to be hydrogen. Thus for the preparation of anion exchangers containing amino groups it is possible, for example, to use methylamine, dimethylamine, ethylamine, diethylamine, ethylmethylamine, propylamine, dipropylamine or methylpropylamine. Preference is given to the use of dimethylamine or diethylamine. For the preparation of anion exchangers containing quaternary ammonium groups it is possible, for example, to use trimethylamine, triethylamine, ethyldimethylamine or diethylmethylamine, with the use of trimethylamine being preferred.

The compounds mentioned react with the oxirane system to form, if sulfurous acid or its compounds are used, sulfonated cation exchangers. The use of primary or secondary amines produces anion exchangers containing amino groups while the use of tertiary amines produces anion exchangers containing quaternary ammonium groups. Excess oxirane groups are hydrolyzed using dilute sulfuric acid to diol groups. The content of the ionic monomer units of the formula III mentioned is from 5 to 50 mol percent, preferably between 10 and 30 mol percent; the remaining monomer units have the diol structure of formula II. The charge density can be adjusted by choosing the concentration of the reactants, i.e. of the sulfurous acid or, respectively, the amines.

Even without further statements it is assumed that a person skilled in the art will be able to utilize the above description in its widest context. Consequently, the preferred embodiments should be interpreted merely as descriptive and in no measure as a disclosure which is in any way limiting.

The complete disclosure of all applications, patents and publications mentioned above and below, and of the corresponding application DE 43 33 821 filed on 4 Oct. 1993, are incorporated into this application by reference.

The examples which follow are intended to illustrate the subject matter in more detail; these examples do not represent a restriction of the subject-matter of the invention.

EXAMPLES

The following reactions are carried out in a 500 ml three-necked flask with stirrer. The suspensions are washed by filtration on a glass frit (G2).

Example 1: Preparation of an Oxirane-activated Support Starting from Fractogel®-TSK HW 65 (S)

A suspension of 100 ml of sedimented Fractogel®-TSK HW 65 (S) and 66 ml of water is mixed, with vigorous stirring at room temperature, with 3 g of ammonium cerium (IV) nitrate (dissolved in a mixture of 180 ml of water and 3 g of $HNO_3$ (65%)). After 1 minute, a solution of 6 g of 2,3-epoxypropyl methacrylate in 44 ml of dioxane is added. Stirring is continued for one hour. The reaction product is subsequently washed twice with 200 ml of water each time.

Example 2: Synthesis of a Diethylamine-substituted Support Material 100 g of gel prepared according to Example 1 and isolated by filtration are suspended in 100 ml of water, and 100 ml of diethylamine are added. The mixture is subsequently stirred at room temperature for 20 hours. The reaction product is then washed twice with 100 ml of water each time.

The washed reaction product is suspended in 100 ml of 0.5M sulfuric acid solution and stirred slowly at 40° C. for two hours. It is then washed with 0.25M phosphate buffer (pH 7) to neutrality and then with water. The gel is stored in aqueous suspension with the addition of 0.02% sodium azide.

The resulting DEA anion exchanger has a capacity of 160 mg of bovine serum albumin/ml of gel.

Example 3: Synthesis of a Triethylamine-substituted Support Material

This material is prepared as described in Example 2 using 100 ml of aqueous trimethylamine solution (30%) instead of the diethylamine.

The resulting quaternary anion exchanger has a capacity of 130 mg of bovine serum albumin/ml of gel.

Example 4: Synthesis of a Sulfonated Support Material 100 g of gel prepared according to Example 1 and isolated by filtration are suspended in a solution of $Na_2SO_3$ (100 g/l) in sodium phosphate buffer 20 g/l (pH 8) and the suspension is stirred at 60° C. for three hours. The reaction product is then washed twice with 100 ml of water each time.

The washed reaction product is suspended in 100 ml of a 0.5M sulfuric acid solution and the suspension is stirred slowly at 40° C. for two hours. It is then washed with 0.25M phosphate buffer (pH 7) to neutrality and subsequently with water. The gel is stored in aqueous suspension with the addition of 0.02% sodium azide.

Use Example A: Determination of the Binding Capacity for Bovine Serum Albumin (Breakthrough Curve)

Support material prepared according to Example 2 is packed into a SuperFormance® glass column (50×10 mm) and equilibrated with the application buffer (50 mM TRIS buffer, pH 8.3). A solution of bovine serum albumin (10 mg/ml) in this buffer is applied continuously to the column (flow rate: 0.5 ml/min) and the elution diagram is measured by photometry at 280 nm. The capacity is determined from the breakthrough curve.

A steep breakthrough curve is found; the capacity is calculated as 158 mg of bovine serum albumin/ml of gel (see FIG. 1).

Use Example B: Determination of the Binding Capacity for Bovine Serum Albumin after Treatment with 1M NaOH 10 ml in each case of support material prepared according to Example 3 are suspended in 40 ml, in each case, of 1M NaOH and heated in a water bath for two hours with occasional shaking (40°, 50° and 60° C.). The samples are subsequently suspended in 50 mM TRIS buffer (pH 8.3). The binding capacity is determined as described in Use Example A:

| Treatment: | Control | 40° C. | 50° C. | 60° C. |
| --- | --- | --- | --- | --- |
| Binding capacity (mg/BSA/ml) | 84.7 | 105.7 | 84.4 | 73.3 |

Use Example C: Separation of Human Serum Albumin, Ovalbumin and Conalbumin

Support material prepared according to Example 2 is packed into a SuperFormance® glass column (50×10 mm) and equilibrated with the application buffer (20 mM TRIS buffer, pH 8.0). A mixture comprising human serum albumin, ovalbumin and conalbumin (4 mg/ml of each) is applied to the column (200 µl). Elution is carried out at a flow rate of 1 ml/min with a gradient of 0 to 1.0M NaCl in 20 mM TRIS buffer, pH 8.0 (duration 100 minutes). The elution diagram is measured by photometry at 280 nm.

Figure 2:
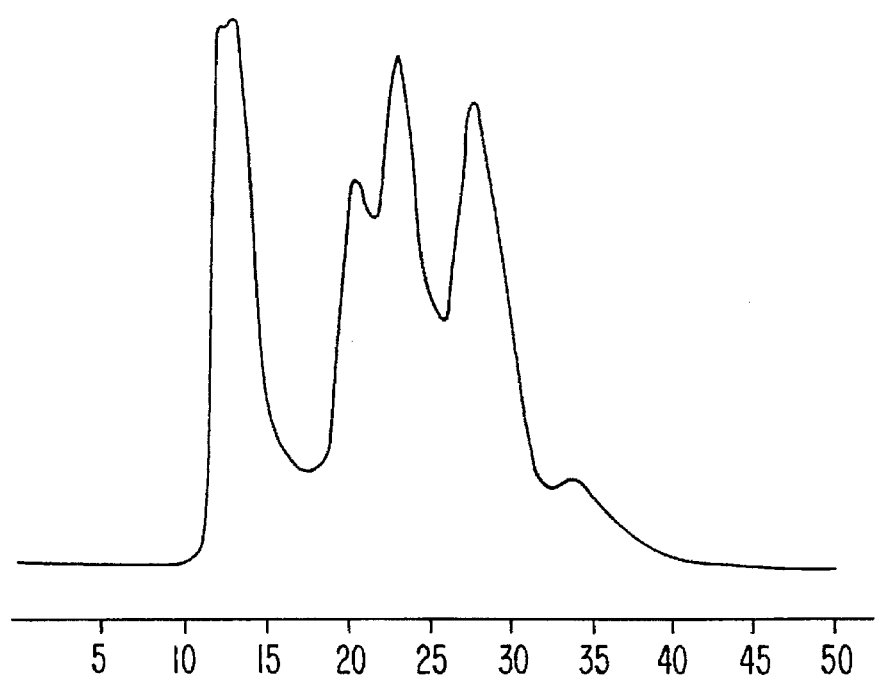
FIG. 2 shows an elution curve from a chromatographic separation of human serum albumin, ovalbumin and conalbumin; experimental details can be found in Use Example C.

The three proteins are separated completely (see FIG. 2).

We claim:

1. A separation material for ion exchange chromatography comprising a hydroxyl-containing base support on the surface of which polymers are covalently bonded, wherein:

a) the base support contains aliphatic hydroxyl groups, b) the covalently bonded polymers are bonded to the base support via a terminal monomer unit, c) the polymers contain monomer units of both the formula II and the formula III:

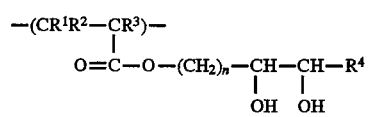

-continued

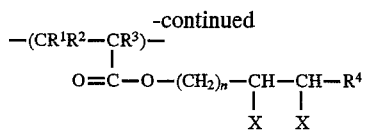
III in which $R^1$, $R^2$ and $R^3$ independently of one another are H or $CH_3$, $R^4$ is H, $C_1$–$C_5$-alkyl or $C_6$–$C_{12}$-aryl, n is an integer between 1 and 5, one radical X is OH and the other radical X is $NR^5R^6$, $N^+R^5R^6R^7$ or $SO_3H$, and $R^5$, $R^6$ and $R^7$ independently of one another are $C_1$–$C_4$-alkyl, it also being possible for one or both radicals $R^5$ and $R^6$ to be H, and d) the monomer units are linked linearly.

2. A separation material of claim 1, wherein, in formula III, one radical X is OH and the other radical X is $NR^5R^6$ with $R^5$ and $R^6$ both being ethyl.

3. A separation material of claim 1, wherein, in formula III, one radical X is OH and the other radical X is $NR^5R^6$ with $R^5$ and $R^6$ both being hydrogen.

4. A separation material of claim 1, wherein, in formula III, one radical X is OH and the other radical X is $N^+R^5R^6R^7$ with each of $R^5$, $R^6$ and $R^7$ being methyl.

5. A separation material of claim 1, wherein, in formula III, one radical X is OH and the other radical X is $SO_3H$.

6. The separation material of claim 1, wherein the polymers contain 5 to 50 mol percent of monomer units of the formula III and the balance of monomer units of the formula II.

7. The separation material of claim 1, wherein the polymers contain 10 to 30 mol percent of monomer units of the formula III and the balance of monomer units of the formula II.

8. A method for separating a mixture of at least two substances by ion exchange chromatographically separating the substances with a separation material according to claim 1.

9. The process of claim 8, wherein the two substances separated are biopolymers.

10. A process for the preparation of a separation material for ion exchange chromatography, comprising reacting an oxirane-containing activated support material in which monomers of the formula I are grafted onto a hydroxyl-containing base support

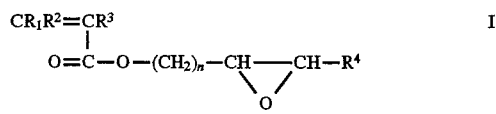
I in which $R^1$, $R^2$ and $R^3$ independently of one another are H or $CH_3$, $R^4$ is H, $C_1$–$C_5$-alkyl or $C_6$–$C_{12}$-aryl, n is an integer between 1 and 5, with sulfurous acid or a salt thereof or with a primary, secondary or tertiary amine of the formula IV

IV in which $R^5R^6$ and $R^7$ independently of one another are $C_1$–$C_4$-alkyl, it also being possible for one or two of these radicals to be H.

* * * * *